United States Patent Office 2,723,984
Patented Nov. 15, 1955

2,723,984

DISPROPORTIONATION OF ARYLALKOXY-SILANES

Donald Leroy Bailey, Buffalo, N. Y., assignor to Union Carbide and Carbon Corporation, a corporation of New York No Drawing. Application October 17, 1952,
Serial No. 315,437

8 Claims. (Cl. 260—448.2)

This invention relates to a method for disproportionating arylalkoxysilanes. More specifically, the invention is concerned with a means of effecting in an assemblage of silicon-containing molecules, each containing at least one aryl group and at least one alkoxy group, a redistribution in such a manner that molecules which are useful in many syntheses are obtained.

According to the present invention, disproportionation of arylalkoxysilanes is obtained by treating such silanes with a suitable catalyst at temperatures of at least 150° C. and preferably at reflux temperatures. For the catalyst I prefer to employ an alkali metal alkoxide, for example, sodium or potassium ethoxide. The amount of catalyst employed is not critical, and, since the preferred catalysts are readily available at reasonable costs, 0.2% or more has been generally employed. The disproportionation of arylalkoxysilanes conducted according to the present invention may be depicted by the following equations:

$$RSi(OR')_3 \rightleftharpoons R_2Si(OR')_2 + Si(OR')_4$$

$$2R_2Si(OR')_2 \rightleftharpoons R_3Si(OR') + RSi(OR')_3$$

$$2R_3Si(OR') \rightleftharpoons R_4Si + R_2Si(OR')_2$$

wherein R is an aryl radical and R' is alkyl.

Arylalkoxysilanes containing alkyl groups attached to the silicon atom in addition to the aryl group may also be disproportionated by the method of this invention. In such instances, the alkyl groups do not affect the general reaction.

As indicated, disproportionation of the arylalkoxysilanes is effected at a temperature of at least 150° C. However, as the reaction is in equilibrium and as the products are present in the reaction mixture, it is desirable to conduct the reaction at reflux temperatures. By so doing, the reaction may take place in a flask connected to a fractionating column, thereby permitting the removal of the lower-boiling product from the reaction mixture and thus driving the reaction to completion with increased yield.

The following examples more fully disclose the invention:

Example I

In a one-liter flask connected to a fractionating column there were placed 455 grams of phenyltriethoxysilane $C_6H_5Si(OC_2H_5)_3$ and one gram of sodium ethoxide catalyst. This mixture was heated at reflux for seven hours, during which time 175.6 grams of material were removed from the column distilling below 200° C. Fractionation of the material distilling below 200° C. and the residual material separately gave the following results:

| | Grams |
|---|---|
| $C_6H_6$ | 5 |
| $Si(OC_2H_5)_4$ | 152.5 |
| $C_6H_5Si(OC_2H_5)_3$ | 140 |
| $(C_6H_5)_2Si(OC_2H_5)_2$ | 81.5 |
| $(C_6H_5)_3Si(OC_2H_5)$ | 37 |
| $(C_6H_5)_4Si$ | 8 |
| Residue | 17 |

Example II

That the reactions of my invention are reversible was readily shown by reacting the main products of a disproportionation. In this instance diphenyldiethoxysilane and tetraethylsilicate, the main products resulting from the disproportionation of phenyltriethoxysilane, were reacted in the presence of sodium ethoxide at a temperature of at least 150° C. The main product prepared was phenyltriethoxysilane. The method comprised placing 105 grams of diphenyldiethoxysilane $$(C_6H_5)_2Si(OC_2H_5)_2$$

92 grams of tetraethylsilicate, $Si(OC_2H_5)_4$; and 1 gram of sodium ethoxide in a 300-cc. stainless steel reactor. After heating the reactor at 250° C. for fifteen hours, it was opened and the reaction products distilled under reduced pressure with the following results:

| | Grams |
|---|---|
| $C_6H_6$ | 4 |
| $Si(OC_2H_5)_4$ | 60 |
| $C_6H_5Si(OC_2H_5)_3$ | 84 |
| $(C_6H_5)_2Si(OC_2H_5)_2$ | 26 |
| $(C_6H_5)_4Si$ | 6 |
| Unidentified residue | 10 |

Example III

In a 250-cc. flask connected to a fractionating column there were placed 108 grams of phenylethyldiethoxysilane $(C_6H_5)(C_2H_5)Si(OC_2H_5)_2$ and 0.5 gram of sodium ethoxide catalyst. The mixture was refluxed for three hours, during which time 50.5 grams of material were removed from the column distilling below 160° C. Fractionation of this material at atmospheric pressure and the remainder of the reaction mixture under reduced pressure gave the following results:

| | Grams |
|---|---|
| $C_6H_6$ | 0.5 |
| $C_2H_5Si(OC_2H_5)_3$ | 51.2 |
| $(C_6H_5)(C_2H_5)Si(OC_2H_5)_2$ | 9.5 |
| $(C_6H_5)_2(C_2H_5)Si(OC_2H_5)$ | 22 |
| $(C_6H_5)_3(C_2H_5)Si$ | 10 |
| Residue | 14 |

Example IV

In a one-liter flask connected to a fractionating column there were placed 406.5 grams of tolyltriethoxysilane $(CH_3 \cdot C_6H_5)Si(OC_2H_5)_3$ and 1 gram of sodium ethoxide catalyst. This mixture was refluxed for five hours, during which time the reaction temperature rose to 270° C. and 144.8 grams of material distilling below 165° C. was removed from the column. Fractionation of the low-boiling material and the residual material separately gave the following results:

| | Grams |
|---|---|
| $C_6H_5 \cdot CH_3$ | 15 |
| $Si(OC_2H_5)_4$ | 134 |
| $(CH_3 \cdot C_6H_5)Si(OC_2H_5)_3$ | 135 |
| $(CH_3 \cdot C_6H_5)_2Si(OC_2H_5)_2$ | 65 |
| $(CH_3 \cdot C_6H_5)_3Si(OC_2H_5)$ | 17 |
| Residue | 30 |

Arylalkoxysilanes which may be disproportionated according to my invention are those that contain only aryl and alkoxy groups attached to silicon; and those that contain only aryl, alkyl, and alkoxy groups attached to silicon.

The invention permits a redistribution of the groups attached to silicon, in an arylalkoxysilane, whereby silicon-containing molecules having more and less alkoxy groups are obtained.

I claim:
1. A process of disproportionating silanes having the following formula

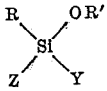

wherein
R is an aryl group,
R' is an alkyl group,
Z is a member taken from the group consisting of aryl, alkoxy and alkyl radicals, and
Y is a member taken from the group consisting of aryl, alkoxy, and alkyl radicals;
which comprises treating said silane with an alkali metal alkoxide at a temperature of at least 150° C.

2. A process of disproportionating silanes having the following formula:

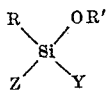

wherein
R is an aryl group,
R' is an alkyl group,
Z is a member taken from the group consisting of aryl, alkoxy, and alkyl radicals, and
Y is a member taken from the group consisting of aryl, alkoxy, and alkyl radicals;
which comprises treating said silane with an alkali metal alkoxide at a temperature of at least 150° C. and recovering silanes which contain more and less alkoxy groups bonded to the silicon atom thereof.

3. A process of disproportionating silanes having the the following formula:

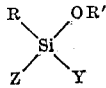

wherein
R is an aryl group,
R' is an alkyl group;
Z is a member taken from the group consisting of aryl, alkoxy, and alkyl radicals; and
Y is a member taken from the group consisting of aryl, alkoxy, and alkyl radicals;
which comprises treating said silane with an alkali metal alkoxide at reflux temperatures and recovering silanes which contain more and less alkoxy groups bonded to the silicon atom thereof.

4. A process of disproportionating phenyltriethoxysilane which comprises treating said phenyltriethoxysilane with an alkali metal alkoxide at a temperature of at least 150° C. and recovering silanes which contain more and less ethoxy groups bonded to the silicon atom thereof.

5. A process of disproportionating diphenyldiethoxysilane which comprises treating said diphenyldiethoxysilane with an alkali metal alkoxide at a temperature of at least 150° C. and recovering silanes which contain more and less ethoxy groups bonded to the silicon atom thereof.

6. A process of disproportionating phenylethyldiethoxysilane which comprises treating said phenylethyldiethoxysilane with an alkali metal alkoxide at a temperature of at least 150° C. and recovering silanes which contain more and less ethoxy groups bonded to the silicon atom thereof.

7. A process of disproportionating tolyltriethoxysilane which comprises treating said tolyltriethoxysilane with an alkali metal alkoxide at a temperature of at least 150° C. and recovering silanes which contain more and less ethoxy groups bonded to the silicon atom thereof.

8. A process of disproportionating silanes having the following formula:

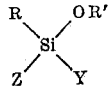

wherein
R is an aryl group,
R' is an alkyl group,
Z is a member taken from the group consisting of aryl, alkoxy, and alkyl radicals, and
Y is a member taken from the group consisting of aryl, alkoxy, and alkyl radicals;
which comprises treating said silane with sodium ethoxide at a temperature of at least 150° C.

References Cited in the file of this patent
UNITED STATES PATENTS

| | | |
|---|---|---|
| 2,276,094 | Rothrock | Mar. 10, 1942 |
| 2,530,367 | Hance | Nov. 21, 1950 |
| 2,627,451 | Erickson | Feb. 3, 1953 |

OTHER REFERENCES

Calengaert et. al.: "Journal Am. Chem. Soc.," vol. 16 (1939), pages 2748–54.
Volnov: "Journal Gen. Chem. (USSR), vol. 17 (1947), pp. 1428–35.
Rochow: "Chemistry of the Silicones," 2nd Edit. (1951), pages 180, 181, Wiley & Sons, publishers, N. Y.